US 006575644B2

(12) United States Patent
Paddock et al.

(10) Patent No.: US 6,575,644 B2
(45) Date of Patent: *Jun. 10, 2003

(54) MOTION ISOLATING SUPPORT SYSTEM

(75) Inventors: George K. Paddock, Los Angeles, CA (US); Gregory L. Richards, Boston, MA (US); Mitchell C. Barham, Redwood City, CA (US); Christopher C. Haarhoff, Kula, HI (US)

(73) Assignee: George Paddock II, Inc., North Hollywood, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/055,721

(22) Filed: Jan. 22, 2002

(65) Prior Publication Data

US 2002/0090215 A1 Jul. 11, 2002

Related U.S. Application Data

(60) Continuation of application No. 09/514,882, filed on Feb. 29, 2000, now Pat. No. 6,347,892, which is a division of application No. 08/889,208, filed on Jul. 7, 1997, now Pat. No. 6,030,130.

(51) Int. Cl.⁷ ............................................... G03B 17/00
(52) U.S. Cl. ....................................................... 396/421
(58) Field of Search ................................ 396/420, 421, 396/422; 352/243; 248/278.1, 280.11, 185.1, 179.1, 576, 594, 276.1; 224/908

(56) References Cited

U.S. PATENT DOCUMENTS

| 4,017,168 A | 4/1977 | Brown ........................ 352/243 |
| 4,156,512 A | 5/1979 | Brown ........................ 248/586 |
| 4,208,028 A | 6/1980 | Brown et al. ................ 224/185 |
| 4,394,975 A | 7/1983 | Brown et al. ................ 352/243 |
| 5,340,072 A | 8/1994 | Halbirt ........................ 248/279 |
| 5,435,515 A | 7/1995 | Di Giulio et al. ........... 248/576 |
| 5,752,112 A | 5/1998 | Paddock et al. ............. 396/421 |
| 5,826,846 A | * 10/1998 | Buccieri et al. ......... 248/278.1 |
| 6,030,130 A | 2/2000 | Paddock et al. ............. 396/421 |
| 6,347,892 B1 | 2/2002 | Paddock et al. ............. 396/421 |

* cited by examiner

Primary Examiner—Alan A. Mathews
(74) Attorney, Agent, or Firm—Fulbright & Jaworski L.L.P.

(57) ABSTRACT

A body mounted camera support system for isolating the camera from body motion includes two arms linked together. Each of the arms is a four bar linkage with two tension cartridges each extending between two adjacent ones of the links. Two of the links are extended to form the body of the arm. These links are tubular in cross section and receive the tension cartridge. A single pin, in association with a yoke at one open end of the tubular link, locks the cartridge in place. Each tension cartridge includes a draw bar and a canister with a compression spring operatively positioned therebetween. The spring is adjusted to include shims which bias the bowing of the spring under initial compression load. A PTFE coating on the canister and on the coil spring further reduces friction.

30 Claims, 7 Drawing Sheets

MOTION ISOLATING SUPPORT SYSTEM

This is a division of U.S. application Ser. No. 09/514,882, filed Feb. 29, 2000, now U.S. Pat. No. 6,347,892, issued Feb. 19, 2002, which is a division of U.S. application Ser. No. 08/889,208, filed Jul. 7, 1997, now U.S. Pat. No. 6,030,130, issued Feb. 29, 2000, the disclosures of which are incorporated herein by reference.

BACKGROUND OF THE INVENTION

The field of the present invention is motion isolating systems for mounting devices requiring a stable position.

In the mid-1970's, mounting systems were developed for motion picture cameras which were used to mount the camera on the body of an operator. These systems were designed to very substantially isolate the motion of the supporting body from the camera. At the same time, the systems provided suspending support for the camera. The supported camera was capable of being lightly guided by the hand of the operator who could move the camera horizontally in all directions either relative to his body or with his body as he moved about. The camera could also be raised or lowered with a relatively light touch. A number of patents have issued on these early systems. They include U.S. Pat. Nos. 4,017,168; 4,156,512; 4,208,028 and 4,394,075. the disclosures of which are incorporated herein by reference.

More recently, refinements to such systems have been considered. Of particular interest is the versatility of the equipment to accommodate different amounts of load. A number of possible load requirements may be contemplated. A trial video image may be desired which would require a relatively light video camera. A much heavier film camera might then be contemplated for the actual image production. Accessories such as stabilizing flywheels, batteries, monitors and the like also may be needed for particular sequences. Thus, a range of support forces can be required.

The performance of such support systems under widely varying load conditions is complex. Through preloading of resilient systems such as springs, the static support weight can be easily accommodated. However, the profile of lifting support across a vertical range of motion can be greatly affected by changes in load. These changes can place the response of the system outside of the acceptable range for operation. Reconfiguration and tuning of the system on location to accommodate such changes in load have been found inconvenient and often unacceptable.

One mechanism which has been devised for adjusting both the load capacity and the profile of load support with vertical motion is disclosed in U.S. Pat. No. 5,435,515, the disclosure of which is incorporated herein by reference. In this system, the support structure geometry is altered through adjustments to the mountings for the resilient force generating elements.

The load to be carried typically includes a tube chassis with a camera platform at the upper end and batteries and other elements at the other. The tube chassis has a handle for manipulating the assembly. A three-axis gimbal mechanism is attached to the tube chassis near but above the center of gravity. The gimbal mechanism is supported by the support system. One such assembly including a tube chassis and three-axis gimbal mechanism is illustrated in U.S. patent application Ser. No. 08/746,204, filed Nov. 6, 1996, now U.S. Pat. No. 5,752,112, the disclosure of which is incorporated herein by reference.

SUMMARY OF THE INVENTION

The present invention is directed to a support system used to isolate motion from the load. Four links are pivotally connected to form a structural, articulated arm. Two opposed links include attachments. The other two links are substantially longer than the links with the attachments. A resilient tension cartridge is held at either end to the linkage with one end pivotally held to one of the links and the other end pivotally held to another link. Multiple such arms may be used with such a system in series.

In a first, separate aspect of the present invention, the support system is arranged with one of the tension cartridge ends being pivotally held to a first link longitudinally outwardly of the pivots of that link. The second end of the tension cartridge is pivotally held to a second link which is pivotally joined to the first link. The tension cartridge thus operates outside of the adjoining pivot between the two links. In this way, a high spring rate on the tension cartridge and substantial moment arm variation on the tension cartridge can be effected in a small area.

In a second, separate aspect of the present invention, the tension cartridge includes a canister with a draw bar extending from the canister. A compression spring within the canister is operatively arranged between the draw bar and the canister. Use of a compression spring substantially shortens the cartridge and enables it to be used in association with two adjacent links to take advantage of the high spring rate.

In a third, separate aspect of the present invention, the tension cartridge of the second aspect further includes shims which may be empirically associated with the compression spring to control initial compression forces to avoid substantial bowing. A polymeric anti-friction coating such as PTFE on the inside of the canister as well as such a coating on the spring may be employed to reduce friction, noise and wear in tension cartridge operation.

In a fourth, separate aspect of the present invention, at least one of the longer links includes a tubular body in cross section with an open end. The tension cartridge extends through this tubular body. This arrangement allows the cartridge(s) to be adjusted for pretension or easily replaced to accommodate substantial changes in the weight of the load. The tubular body and the associated attachment arrangement contributes to torsional rigidity as well.

In a fifth, separate aspect of the present invention, a method for reducing friction in a compression spring canister is contemplated. A spring is compressed to observe the direction of lateral bow induced in the spring with compression. One or more shims are added to the end or ends of the spring to resist the bowing under initial compression. The ends of the spring and shims are then effectively nonparallel in the relaxed state. The spring is then introduced into the canister.

In another, separate aspect of the present invention, the combination of any two or more of the foregoing aspects are contemplated to be employed in concert. Further, the use of multiple tension cartridges with an arm and multiple arms linked together are contemplated.

Accordingly, it is an object of the present invention to provide an improved isolating support system and components therefor. Other and further objects and advantages will appear hereinafter.

DETAILED DESCRIPTION OF THE PREFERRED EMBODIMENT

Figure 1:
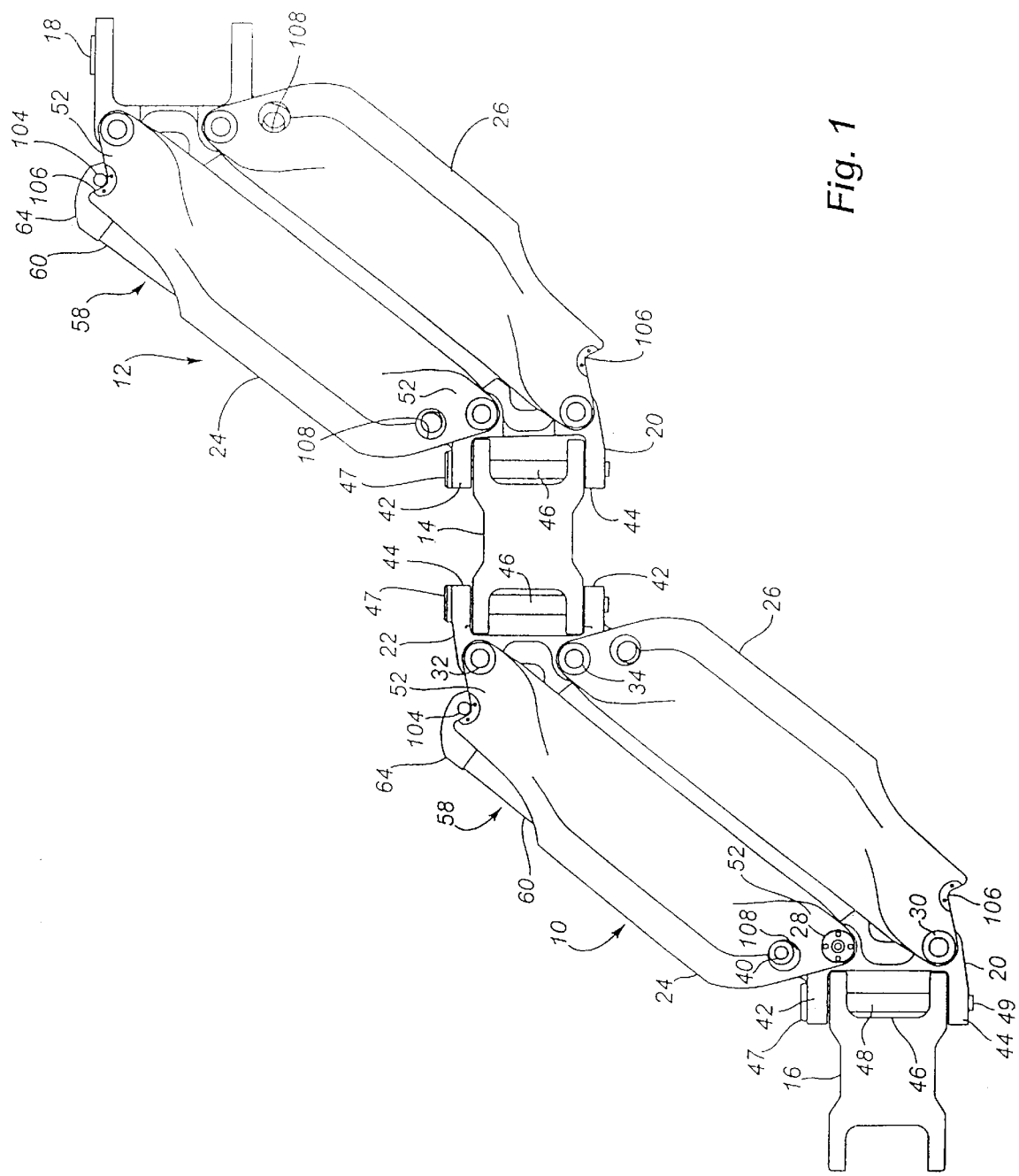
FIG. 1 is a side view of a body mounted camera support system shown in the unloaded state with one tension cartridge illustrated in each arm.
Figure 2:
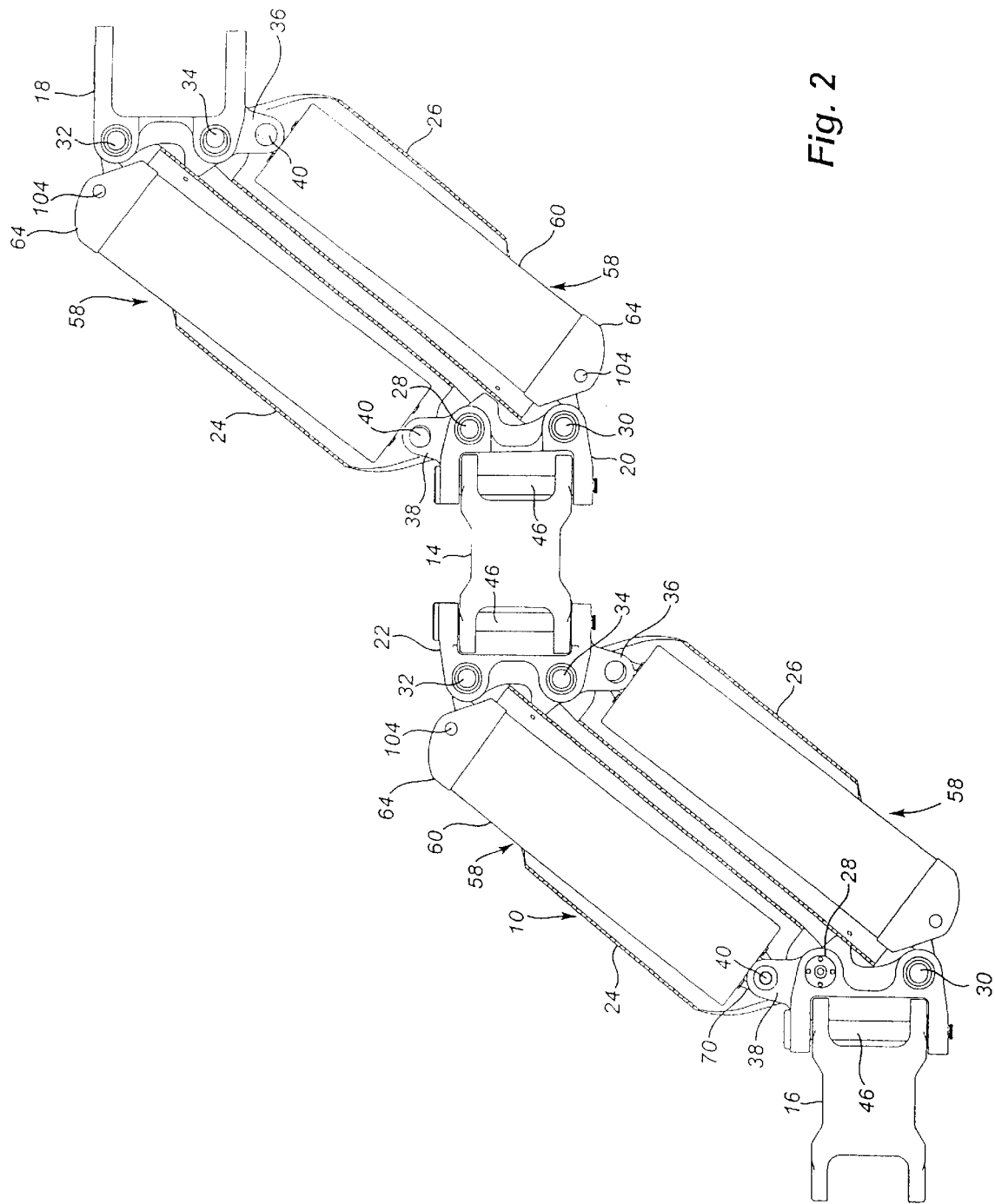
FIG. 2 is a cross-sectional side view illustrating the system of FIG. 1 with the extended links in cross section to illustrate the placement of tension cartridges.
Figure 3:
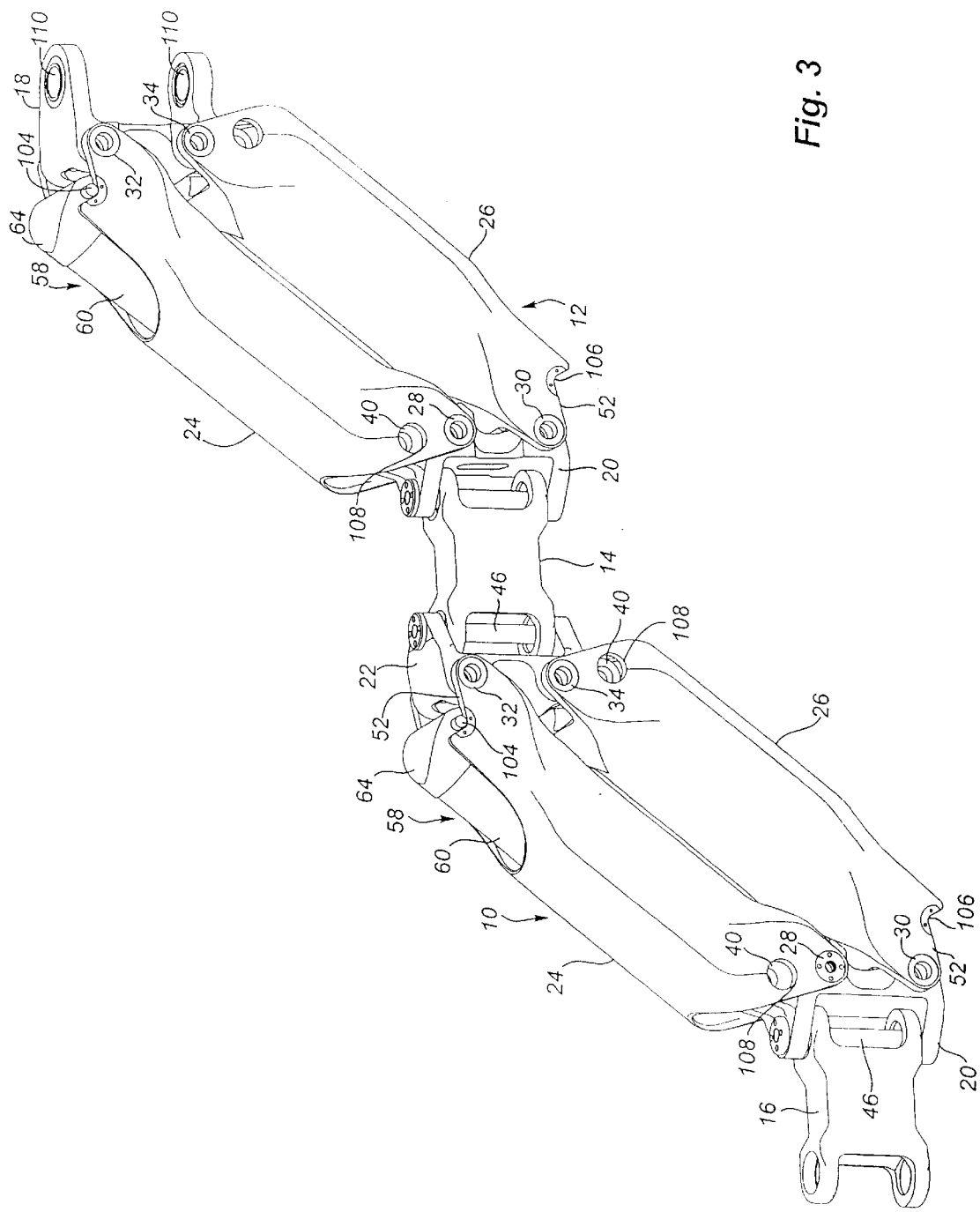
FIG. 3 is the system of FIG. 1 slightly rotated for clarity.
Figure 4:
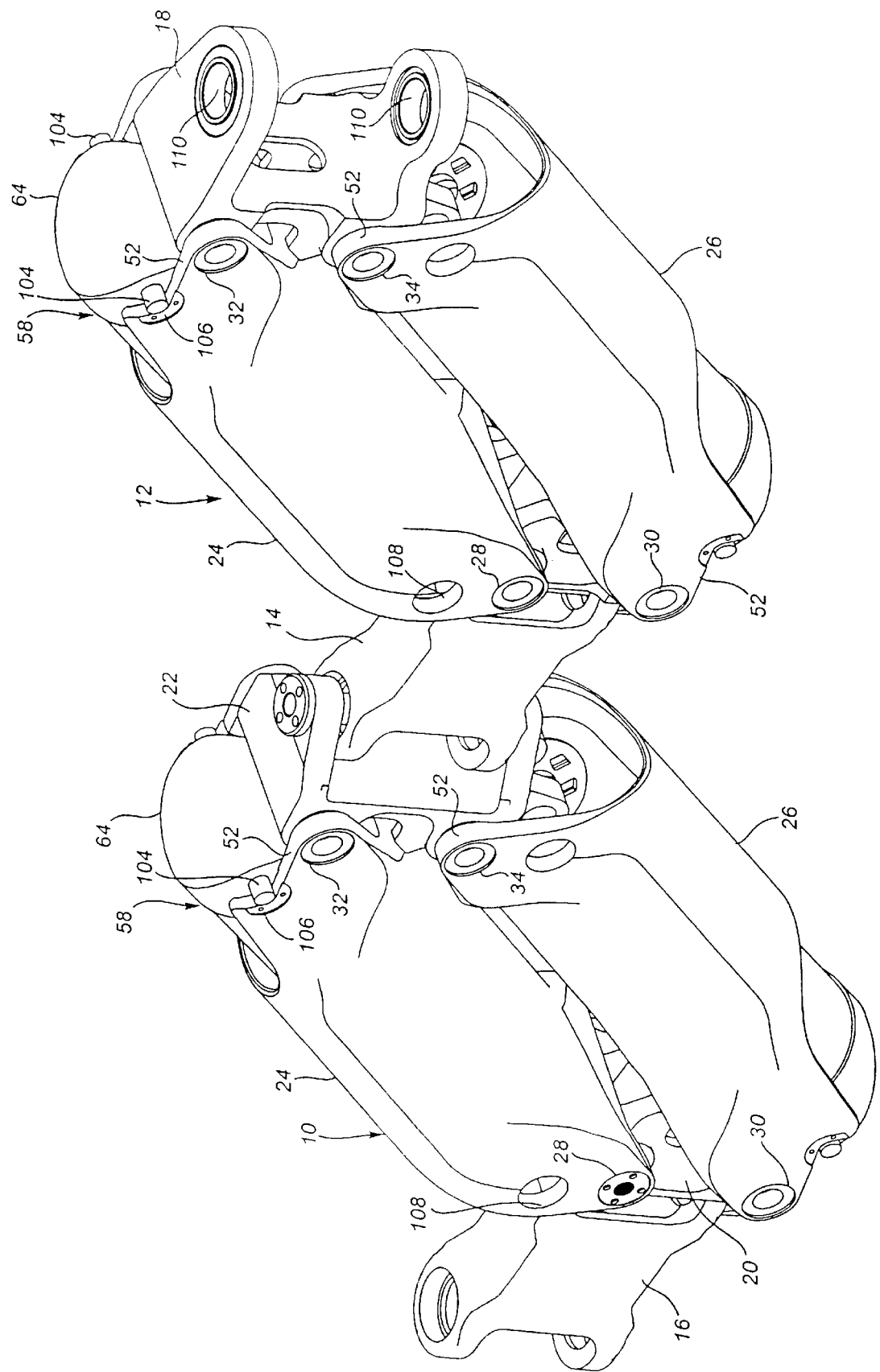
FIG. 4 is the system of FIG. 1 illustrated through a substantial rotation for clarity.

Turning in detail to the drawings, a body mounted camera support system is illustrated which includes two arms, generally referred to as 10 and 12. The arms 10 and 12 are pivotally joined through a link 14. A body mount 16 is associated with one end of the arm 10. The body mount 16 is intended to be attached to a harness which is positioned on the chest of the camera operator. Such harnesses are commercially available. At the other end of the assembly, a special camera attachment 18 is integrally formed with part of the arm 12. Any or all of links 14, 16 and 18 may include a split clamp or other known device for association with an adjacent pin or member to introduce drag or even locking with the adjacent assembly. In place of or in addition to drag, a return spring may be employed to bias the links to neutral positions.

Looking to the arms 10 and 12, the arms are substantially identical with the exception of the camera attachment 18 and certain dimensional changes discussed below. Reference will be made solely to the arm 10 except in these respects. The arm 10 includes two attachment links 20 and 22 and two tubular links 24 and 26. The attachment links 20 and 22 are identical as are the tubular links 24 and 26. These four links 20 through 26 are pivotally joined together at pivots 28, 30, 32 and 34. The links 20 through 26, along with the pivots 28 through 34, define a four bar to linkage which is a parallelogram. The overall structure is preferably of light structural material such as aluminum.

Each of the links 20 and 22 defines four pivot axes. Three of these axes are parallel while the fourth is at right angles to the other three. On the link 20, two of the axes locate the axes of the pivots 28 and 30. Similarly, on link 22, these axes locate pivots 34 and 32. Another axis on each of these links defines an attachment point for one end of a tension cartridge. In each case, this axis is defined by a clevis hitch including lugs 36 and 38 for attachment of the tension cartridge by a pin 40. The pin 40 is a bolt with a smooth shank and a threaded end to receive a nut or to thread directly into the lug 38. The threads are preferably fine to contribute a self locking character. Another set of clevis lugs 42 and 44 defines the axis at right angles to the other three axes. A clevis pin 46 cooperates with the lugs 42 and 44 to define an attachment to which the body mount 16 or the link 14 may be pivotally associated. The clevis pin 46 includes a head 47, a smooth shank 48 and a threaded end 49. The smooth shank 48 provides a bearing surface to pivotally engage the two lugs 42 and 44 and holes on the split ends of the body mount 16. The link 22 is inverted in its orientation on the arm as compared with the link 20. However, it is configured to accommodate the pin 46 in the upright orientation. This is intended for ease of assembly.

The tubular links 24 and 26 are identical. Each includes open ends to receive a tension cartridge at one end and to receive the lugs 36 and 38 associated with the links 20 and 22 at the other. At the pivots 28, 30, 32 and 34, the tubular links 24 and 26 extend longitudinally to pairs of wings 52. These extensions 52 provide operatively elongated links and also provide a wide mounting arrangement to enhance the stability of the pivots 28 through 34. Naturally, the tubular structures themselves provide substantial torsional resistance relative to their weight.

Figure 5:
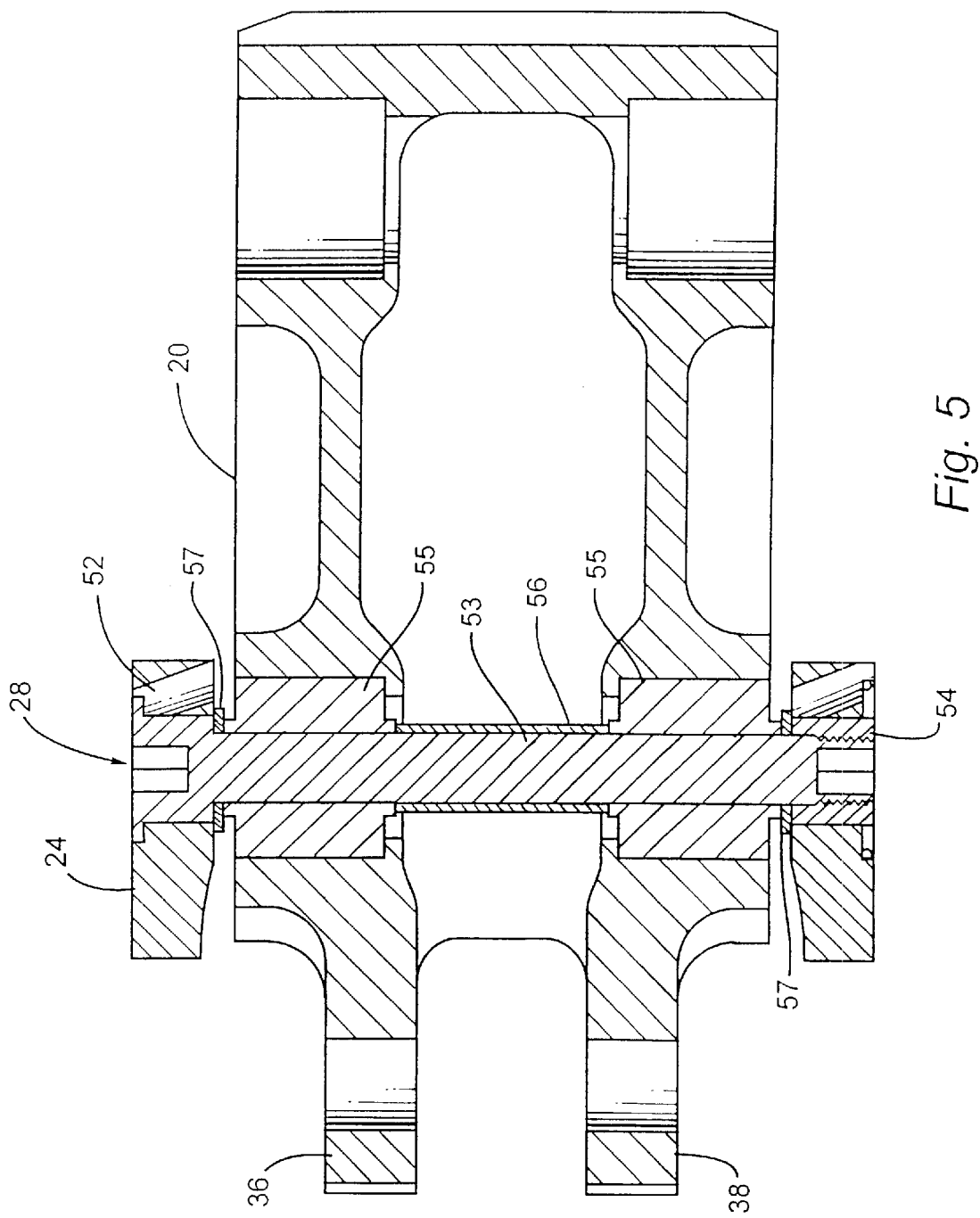
FIG. 5 is a partial cross section of a pivot between links.

Looking specifically at FIG. 5, the pivot 28, representative of the pivots 28, 30, 32 and 34, includes a horizontal pin 53 extending across the pair of wings 52 at the open end of the tubular link 24 adjacent the attachment link 20. A horizontal pin cap 54 receives the pin 53. Both are inset in the wings 52 to avoid obstructions on the outside of the arm which could interfere with use of the system. Both the head of the pin 53 and the cap 54 are arranged to transfer compression to the wings 52 when the pin 53 is tightened in place. The attachment link 20 includes floating bearings 55 aligned to receive the pin 53. A bearing spacer 56 is located between the bearings 55; and thrust washers 57 are placed outwardly of the bearings 55. As the pin 53 is tightened, the entire assembly is brought into compression. In this way, the pivot is stabilized. Further, the tubular link 24 is strengthened against torsional loads as the wings 52 are unable to move relative to one another.

A tension cartridge, generally designated 58, is located in one of the two tubular links 24 and 26. A second cartridge 58 may be similarly located in the other of these tubular links depending upon the load carried by the camera mount 18. The tension cartridges 58 act cumulatively with one another in each arm. Cartridges 58 of varying spring rate may be selected to accommodate a range of mounting loads. Combinations of cartridges 58 of different spring rates can also be used to provide a variety of load weight ranges for the arm. The same combination of cartridges 58 is preferably used in both arms 10 and 12 to obtain a uniform response from the overall support system.

Figure 6:
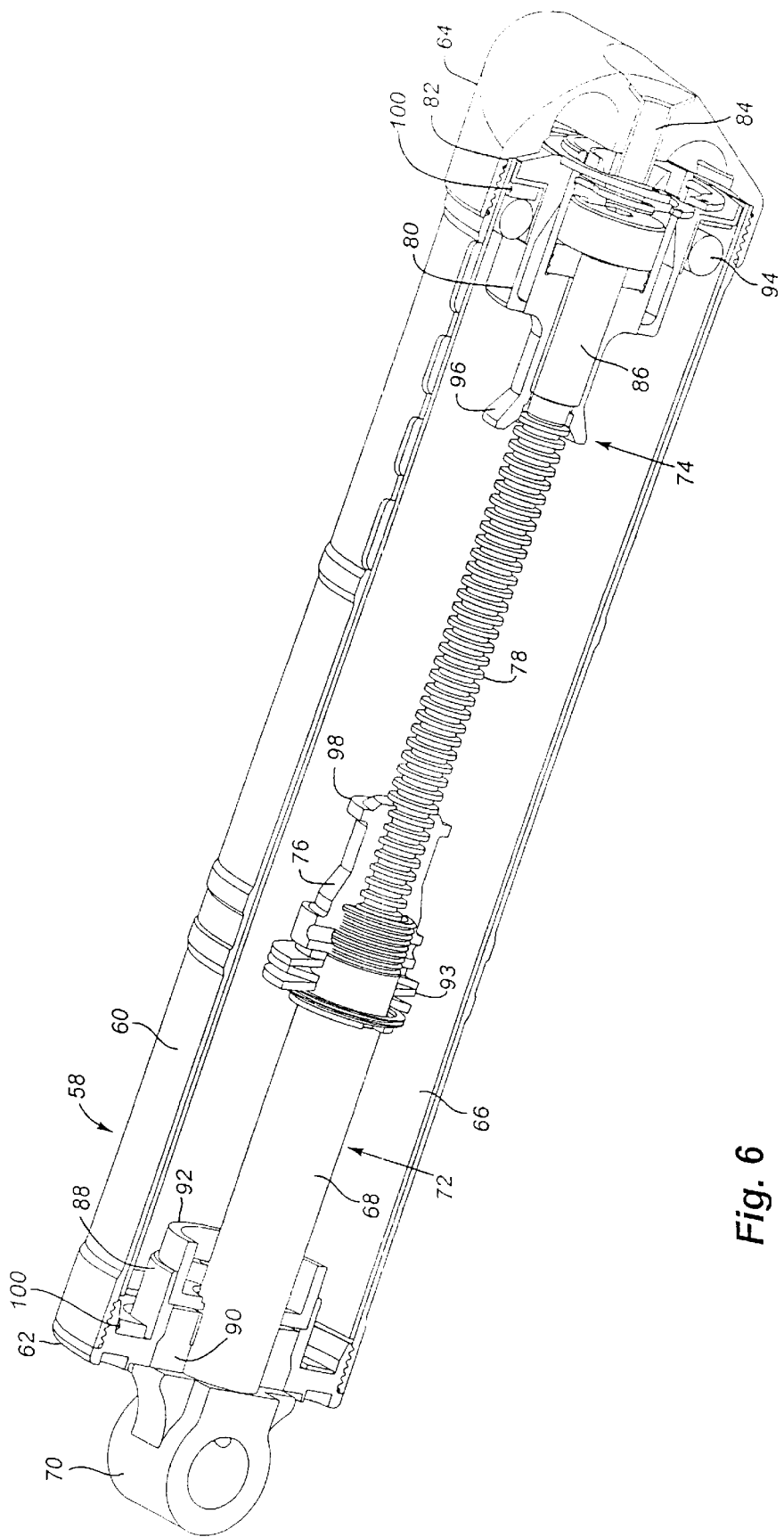
FIG. 6 is a perspective cross section of a tension cartridge.

A tension cartridge 58 is best illustrated in FIG. 6. The cartridge includes a tubular canister 60. The canister 60 is threaded at each end to receive two end caps 62 and 64. The interior wall 66 of the canister 60 is provided with a polymeric anti-friction coating such as PTFE. Located within the tubular canister 60 is a draw bar 68. The draw bar extends from the end of the canister 60 to an eye 70.

The draw bar 68 is divided into two assemblies 72 and 74. The assembly 72 includes a threaded nut 76 fixed to a hollow tube 77. A threaded shaft 78 on the assembly 74 mates with the threaded nut 76. Rotation of the shaft 78 relative to the nut 76 lengthens or shortens the draw bar 68. The shaft 78 is rotatably mounted relative to a hub 80. This hub 80 includes an outwardly extending flange 82. The hub 80 and flange 82 are slidably arranged within the canister 60 and can move through the canister 60 either as part of an adjustment through rotation of the threaded shaft 78 or through extraction of the draw bar 68 by force applied to the eye 70. Adjustments are made through the end cap 64. A passage 84 extends inwardly through the end cap 64 to a hexagonal socket associated with the head 86 of the threaded shaft 78. Insertion of a hexagonal wrench through the passage 64 to engage the head 86 to rotate the shaft 78 effects adjustment of the draw bar 68. An elastomeric cover with a slit may be used at the entrance to the passage 64 to avoid contamination of the interior of the cartridge 58.

The end cap 62 includes an annular cavity 88 to define a spring seat in opposition to the spring seat defined by the flange 82 on the hub 80 of the draw bar 68. A draw bar bearing 90 is positioned inwardly of the annular cavity 88 to accommodate axial motion of the draw bar 68 therethrough.

An annular seat 92 is also provided on the end cap 62. This seat 92 cooperates with a stack of conically shaped spring washers 93 associated with the nut 76 around the draw bar 68. A cushion is thus defined for reducing the impact when the tension cartridge 58 reaches its limit.

A compression spring 94 is located within the tubular canister 60 and is operatively positioned between the canister 60 and the draw bar 68 by locating the ends of the spring 94 in the annular cavity 88 and against the flange 80. This spring is preferably a coil spring coated with a polymeric anti-friction coating such as PTFE in order that it might experience low friction, low noise and low wear in movement across the interior wall 66, also coated with PTFE.

A stop 96 is provided on the second assembly 74 of the draw bar 68. This stop 96 cooperates with a seat 98 on the first assembly 72 to limit preload adjustment. The stop 96 is positioned such that the spring 94 is not fully compressed upon full extension of the tension cartridge 58 with maximum pretensioning. In this way, the compression spring cushion 93 is not defeated.

Figure 8:
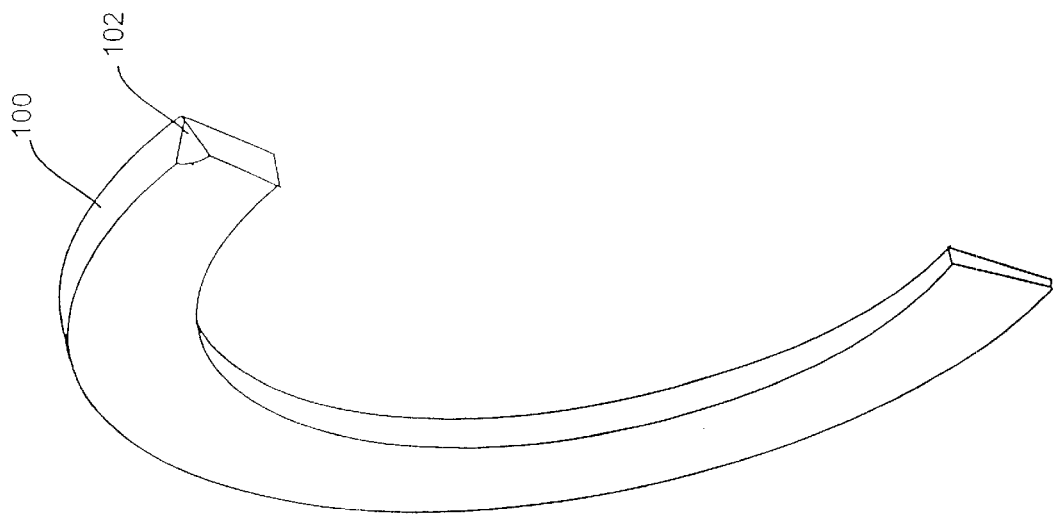
FIG. 8 is a perspective cross-sectional view of the shim of FIG. 7.
Figure 7:
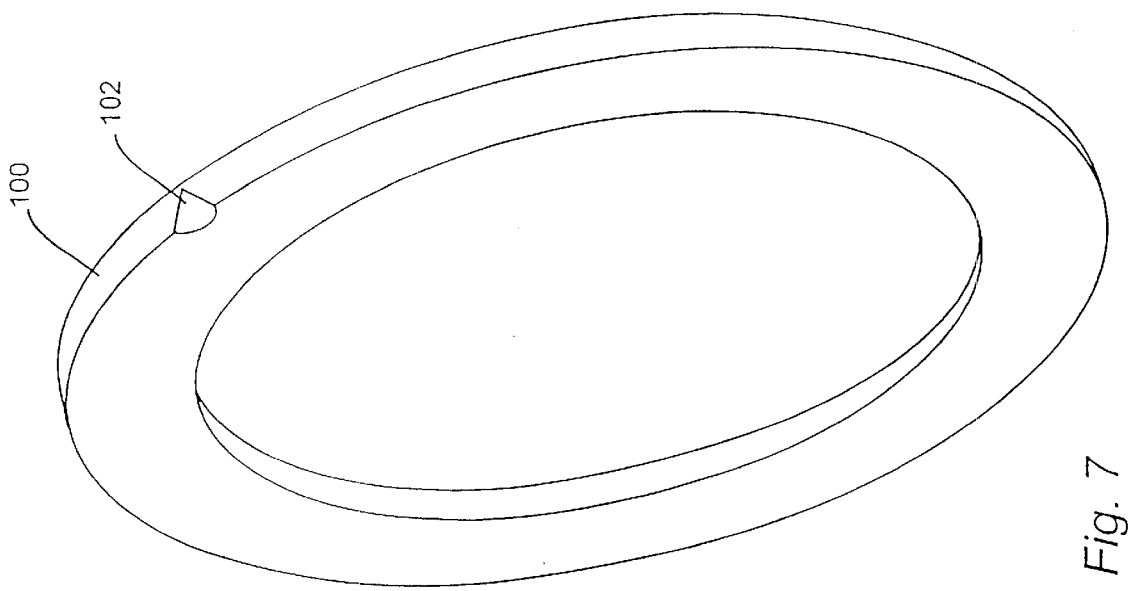
FIG. 7 is a perspective view of a shim.

The spring 94 is assembled with shims 100 as seen in FIGS. 7 and 8. These shims 100 are circular and have end surfaces which are not parallel. The shims 100 are located at the ends of the spring 94 in a preassembly set of aligned spring seats. The end caps are drawn together to observe bowing within the spring 94. Once observed, the shims 100 are rotated relative to the spring 94 until bowing is minimized. At this point, the shims 100 are tacked to the spring 94. A notch 102 in the shim 100 is simply an indicator of the point of maximum thickness on the shim 100 to assist in orientation during empirical testing. Thus, the assembly of the shims 100 and the spring 94 does not have parallel ends when fully relaxed. The spring 100 is then placed in a cartridge 58.

A phenomenon is being employed through the use of the shims 100. It has been observed that a substantial lateral force of bowing exists with the spring 94 moderately compressed. As the spring 94 becomes more severely compressed, the lateral force of bowing decreases greatly. Thus, control of bowing under moderate compression through the use of the shims 100 is sufficient to greatly reduce the side load resulting in rubbing friction between the spring 94 and the interior wall 66 of the canister 60. Under greater compression, the side loads are sufficiently low that excessive rubbing is not experienced. In spite of the relative length to diameter of the relaxed spring 94, which is 6.1:1 in the heaviest spring and 5.2:1 in the lightest as employed in the embodiment, the spring 94 and canister 60 exhibit little wear from rubbing because of bowing under these constrained conditions. The load characteristics of the system depend on the tension cartridges 58. Two adjustments can be effected for establishing these characteristics. First is the selection of the cartridges 58. Second is the pretensioning of the cartridges 58 selected. In each arm 10 and 12, one or two cartridges 58 may be used. As noted above, the cartridges 58 in each arm act cumulatively.

The spring constants of the cartridge or cartridges 58 are selected to provide a certain range of capacity to each arm 10 and 12. These cartridges 58 are then adjusted for preload as noted above so that a neutral position is established at the preference of the operator. To provide convenient flexibility, the cartridges 58 are easily replaced. To this end, the cartridges 58 include trunnions 104 on the end cap 64. The tubular links 24 and 26 provide an open end for receipt of the tension cartridge 58. Recesses 106 are formed into this open end to receive the cartridge trunnions 104. The pin 40 is then positioned through the eye 70 of the draw bar 68 and the clevis lugs 36 and 38 of the link 20 and secured. The tubular links 24 and 26 include access holes 108 for placement of the pin 40. The appropriate camera or other load is then positioned through the camera attachment 18 on the second arm 12. The attachment 18 is shown to have two vertically oriented holes 110 for receipt of a camera mounting gimbal assembly or the like. Any appropriate attachment may be used depending on the configuration of the load attachment.

The arm 10 is to support the arm 12 as well as the camera and equipment load. It is possible to create substantially the same response in both arms 10 and 12 by increasing the capacity of the tension cartridges 58 in the arm 10. This would make the necessary cartridge sets different for each arm 10 and 12. Instead, the cartridges 58 remain interchangeable between arms 10 and 12. To obtain this result, the attachment points at the pin 40 on the attachment links 20 and 22 are at different locations on each arm. On the arm 10, the pin 40 is located 1.10 inches beyond the pivot axis of the pivot 28 as measured along the pivot plane of the link defined by the axes through the pivots 28 and 30 and 0.135 inches laterally of that plane in a displacement away from the tubular link 24. On the arm 12, the corresponding dimensions are 1.03 inches and 0.120 inches, respectively. The offset laterally of the pivot plane of the link affects "operator input" which is the load profile as the mount moves vertically.

The spring constants in the cartridges 58 are high. Spring constants in the range of 48 pounds per inch to 60 pounds per inch are employed in the embodiment. Use of such stiff springs results in the cartridges 58 being quite compact. This allows the cartridges 58 to extend along a single link and fit within the tubular body thereof. A spring diameter of 1.70 inches is contemplated with relaxed spring lengths of 10.37 inches for a heavier spring to 8.84 inches for a lighter spring. In turn, two lifting triangles are able to be associated with each arm and the assembled arms have a smooth and compact profile.

To accommodate a high spring constant with the tension cartridges 58, the distance between, for example, the pivot 28 and the line between the pivot attachments at 40 and 104 of the tension cartridge 58 is designed to be small. This distance is a maximum of 1.11 inches for the arm 10 and 1.04 inches for the arm 12 in the current design. The moment arm resulting from the weight of the load is at a maximum with the arm 10, 12 extending in a horizontal orientation. Consequently, the distance between the pivot 28 and the line of action of the tension cartridge 58 is at a maximum with the arm at or near horizontal depending on the lifting profile desired. The length of the tubular link 24 between pivots 28 and 32 is 9.25 inches.

The higher spring constant also contributes to greater latitude in adjustment. By having a high spring constant, smaller changes in precompression of the spring effect the same change in preload. Lower spring constants make a lower slope on the lifting profile easier to achieve. However, other of the foregoing features would require compromise. Even so, a lifting profile having about three pounds of up force at the lower extreme and the same down force at the upper extreme has been achieved. This profile varies across the load range accommodated by adjustment of the cartridges 58 by no more than about a pound either way. With two of the heavier spring cartridges 58 used per arm 10, 12, such a range of lifting profiles is achieved for a load range of 50 pounds to 72 pounds. With the lighter spring cartridges 58, a load range of 29 pounds to 55 pounds is similarly accommodated. As noted above, only one cartridge 58 need be used. With one heavier spring cartridge 58, the range is 24 pounds to 34 pounds. With one lighter spring cartridge 58, the range is 13 pounds to 24 pounds. Additionally, a spring index of from 6.14 to 6.80 has been found to provide sufficient maximum load and load adjustment.

Accordingly, an improved body mounted camera support system is disclosed. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A support system for isolating a load from motion of a support, comprising
    a first link having first and second pivots and a first attachment;
    a second link having third and fourth pivots and a second attachment;
    a third link substantially longer than the first and second links and mounted to the first and third pivots;
    a fourth link substantially longer than the first and second links and mounted to the second and fourth pivots;
    a tension cartridge with two ends, one of the two ends being pivotally held to the first link longitudinally outwardly from the first and second pivots beyond the first pivot and the other of the two ends being pivotally held to the third link, a line between the two ends being outside of the area defined by the four pivots at adjacent the first pivot.

2. The support system of claim 1, the four links with the four pivots forming a parallelogram.

3. The support system of claim 1, the other of the two ends being pivotally held to the third link outwardly from the area defined by the four pivots and the line between the two ends being outwardly from the area defined by the four pivots fully between the two ends.

4. The support system of claim 1, the third link having a tubular body in cross section.

5. The support system of claim 4, the tubular body having an open end, the tension cartridge extending through the tubular body.

6. The support system of claim 5, the tubular body terminating at the open end with recesses, the cartridge including trunnions at one of the ends thereof extending laterally outwardly therefrom to abut against the recesses.

7. The support system of claim 6, the tension cartridge including a preload adjustment accessible through an end of the tension cartridge at the open end of the tubular body.

8. The support system of claim 1 further comprising
    a second tension cartridge with two ends, one of the two ends of the second cartridge being pivotally held to the second link longitudinally outwardly from the third and fourth pivots beyond the fourth pivot and the other of the two ends of the second tension cartridge being pivotally held to the fourth link, a line between the two ends of the second cartridge being outside of the area defined by the four pivots at adjacent to the fourth pivot.

9. The support system of claim 8, the fourth link having a tubular body in cross section.

10. The support system of claim 9, the tubular body of the fourth link having an open end, the second tension cartridge extending through the tubular body of the fourth link.

11. The support system of claim 10, the tubular body of the fourth link terminating at the open end with recesses, the cartridge including trunnions at one of the ends thereof extending laterally outwardly therefrom to abut against the recesses.

12. The support system of claim 1, the tension cartridge including a canister having one of the two ends, a draw bar extending in the canister and having the other of the two ends and a compression spring within the canister and operatively between the draw bar and the canister.

13. The support system of claim 12, the tension cartridge further including shims fixed at either end of the compression spring, the compression spring being a coil spring.

14. The support system of claim 13, the assembly of the compression spring with the shims having ends which are not parallel when the compression spring is not compressed.

15. The support system of claim 14, the shims being circular with the end surfaces not parallel, the angular locations of the shims relative to the spring being empirically determined to minimize bowing in the spring.

16. The support system of claim 15, the canister being lined with polymeric anti-friction material and the compression spring being coated at least at the circumferential surfaces with polymeric anti-friction material.

17. The support system of claim 12, the draw bar being in two pieces threadably engaged to adjust the length of the draw bar with precompression of the compression spring operatively changed thereby.

18. The support system of claim 12, the cartridge further including a cushion operatively between the draw bar and the canister to define a cushioned limit to the extent of travel of the draw bar relative to canister.

19. The support system of claim 1, the first link having an attachment pivot receiving the end of the tension cartridge pivotally held to the first link, the attachment pivot being longitudinally outwardly from the first and second pivots beyond the first pivot and laterally displaced from the pivot plane of the link extending through the first and second pivots in a direction away from the extension of the third link from the attachment pivot.

20. The support system of claim 19, the distance between the attachment pivot and the first pivot being no more than about 12 percent of the distance between the first pivot and the third pivot.

21. The support system of claim 20, the spring constant for the tension cartridge being about 48 to 60 pounds per inch.

22. A support system for isolating a load from motion of a support, comprising
    a first arm and a second arm, each arm including a first link having first and second pivots and a first attachment, a second link having third and fourth pivots and a second attachment, a third link substantially longer than the first and second links and mounted to the first and third pivots, and a fourth link substantially longer than the first and second links and mounted to the second and fourth pivots;
    two tension cartridges, each tension cartridge being mounted to one of the arms, respectively, and including two ends, one of the two ends being pivotally held to the respective first link longitudinally outwardly from the respective first and second pivots beyond the first pivot and the other of the two ends being pivotally held to the respective third link, a line between the two ends being outside of the respective area defined by the respective four pivots at adjacent the respective first pivot; and
    a pivot link, one of the first and second attachments of the first arm including a camera mount and the other of the first and second attachments of the first arm being pivotally coupled to the pivot link, one of the first and second attachments of the second arm including a body mount and the other of the first and second attachments of the second arm being pivotally coupled to the pivot link.

23. A support system for isolating the camera from body motion, comprising
- a first link having first and second pivots and a first attachment;
- a second link having third and fourth pivots and a second attachment;
- a third link substantially longer than the first and second links and mounted to the first and third pivots;
- a fourth link substantially longer than the first and second links and mounted to the second and fourth pivots;
- a tension cartridge with two ends, the tension cartridge including a canister having one of the two ends, a draw bar extending in the canister and having the other of the two ends and a compression spring within the canister and operatively between the draw bar and the canister, one of the two ends being pivotally held to the first link and the other of the two ends being pivotally held to the third link, one of the first and second attachments including one of a camera mount and a body mount.

24. The support system of claim 23, the tension cartridge further including shims fixed at either end of the compression spring, the compression spring being a coil spring.

25. The support system of claim 24, the assembly of the compression spring with the shims having ends which are not mutually parallel when the compression spring is not compressed.

26. The support system of claim 24, the angular locations of the shims being empirically determined to minimize bowing.

27. The support system of claim 26, the canister being lined with polymeric anti-friction material and the compression spring being coated at least at the circumferential surfaces with polymeric anti-friction material.

28. The support system of claim 24, the compression spring having a relaxed length to diameter ratio of about between 5.2:1 and 6.1:1.

29. The support system of claim 23, the spring constant for the tension cartridge being about 48 to 60 pounds per inch.

30. A support system for isolating the camera from body motion, comprising
- a first link having first and second pivots and a first attachment;
- a second link having third and fourth pivots and a second attachment;
- a third link substantially longer than the first and second links, mounted to the first and third pivots, and having a tubular body in cross section;
- a fourth link substantially longer than the first and second links and mounted to the second and fourth pivots;
- a tension cartridge with two ends, one of the two ends being pivotally held to the first link and the other of the two ends being pivotally held to the third link, one of the first and second attachments including one of a camera mount and a body mount, the tubular body having an open end, the tension cartridge extending through the tubular body.

* * * * *